US012780597B2

(12) United States Patent
Tripp et al.

(10) Patent No.: US 12,780,597 B2
(45) Date of Patent: Nov. 3, 2026

(54) DISPENSING AND RETRACTING A CABLE FOR A SUBMERSIBLE VEHICLE

(71) Applicant: Howe & Howe Inc., Waterboro, ME (US)

(72) Inventors: Forrest Joel Tripp, East Waterboro, ME (US); Anthony Victor Castro, Cape Elizabeth, ME (US)

(73) Assignee: Howe & Howe Inc., Waterboro, ME (US)

( * ) Notice: Subject to any disclaimer, the term of this patent is extended or adjusted under 35 U.S.C. 154(b) by 492 days.

(21) Appl. No.: 18/376,536

(22) Filed: Oct. 4, 2023

(65) Prior Publication Data

US 2024/0116734 A1 Apr. 11, 2024

Related U.S. Application Data

(60) Provisional application No. 63/413,352, filed on Oct. 5, 2022.

(51) Int. Cl.
*B65H 75/36* (2006.01)
*H01Q 1/04* (2006.01)

(52) U.S. Cl.
CPC ............. *B65H 75/368* (2013.01); *H01Q 1/04* (2013.01); *B65H 2701/34* (2013.01)

(58) Field of Classification Search
CPC ..... B65H 75/368; B65H 2701/34; H01Q 1/04
See application file for complete search history.

(56) References Cited

U.S. PATENT DOCUMENTS

| | | | | |
|---|---|---|---|---|
| 1,936,463 A * | 11/1933 | Strang | B65H 75/368 242/372 |
| 3,158,865 A | 11/1964 | Mccorkle | |
| 3,972,047 A | 7/1976 | Lombardi | |
| 6,463,868 B1 | 10/2002 | Williams et al. | |
| 6,512,496 B2 | 1/2003 | Alexeff et al. | |
| 6,738,314 B1 | 5/2004 | Teeter et al. | |
| 7,165,504 B1 | 1/2007 | Miller | |
| 9,007,271 B2 | 4/2015 | Harscher et al. | |
| 10,044,089 B2 | 8/2018 | Huckfeldt et al. | |
| 2006/0207158 A1 | 9/2006 | Brewer | |
| 2010/0000463 A1 | 1/2010 | Root, Jr. | |
| 2012/0192779 A1 | 8/2012 | Teppig, Jr. et al. | |
| 2016/0319798 A1 | 11/2016 | Blodgett et al. | |
| 2016/0340006 A1 | 11/2016 | Tang | |

FOREIGN PATENT DOCUMENTS

| | | |
|---|---|---|
| CN | 101376326 | 3/2009 |
| EP | 2364908 | 8/2015 |

* cited by examiner

*Primary Examiner* — Stephen P Avila
(74) *Attorney, Agent, or Firm* — BainwoodHuang

(57) ABSTRACT

A technique for managing a cable for an antenna involves applying (or providing) a cable retracting force to a carrier which is movable relative to a cable guide. The cable extends from a connector through the carrier and through the cable guide to an antenna platform for the antenna. The cable retracting force biases the carrier away from the cable guide. The technique further involves moving the carrier toward the cable guide to dispense the cable through the cable guide in response to a pulling force on the antenna platform exceeding the cable retracting force. The technique further involves moving the carrier away from the cable guide to retract the cable through the cable guide in response to the pulling force on the antenna platform being less than the cable retracting force.

20 Claims, 8 Drawing Sheets

DISPENSING AND RETRACTING A CABLE FOR A SUBMERSIBLE VEHICLE

FIELD

Certain embodiments are generally in the field of dispensing and retracting a cable, and such embodiments relate more specifically to antenna deployment on a submersible vehicle.

BACKGROUND

Operators of amphibious and other submersible vehicles often wish to maintain wireless communication between vehicles and remote communication endpoints, even when those vehicles are submerged. As water attenuates wireless signals, vehicles may use deployable antennas, which rise to or above the surface of a body of water and can transmit and receive wireless signals unimpeded by water.

One prior approach for a deployable antenna uses an antenna mast and a spool of antenna cable. When a vehicle submerges, the mast is deployed and the antenna cable pays out from the spool. When the vehicle later surfaces, the mast retracts and the cable is rolled back onto the spool.

SUMMARY

Unfortunately, the above-described prior approach can involve deficiencies. For example, the antenna cable can become twisted by the spool as the spool rotates to roll out or roll up the cable. To avoid such twisting, which can cause the cable to break or otherwise become damaged, the prior approach may use a slip ring, i.e., a device that maintains electrical contact between a stationary part and rotating part. Slip rings can be expensive, however, and they can be prone to failure in wet environments. What is needed is a way of dispensing and retracting an antenna cable without requiring a slip ring.

Improved techniques are directed to dispensing and retracting a cable for an antenna from a cable guide (e.g., a plate and a pulley to redirect the cable) through which a cable is biased in a retracting direction via a retraction force. The retraction force is strong enough to retract the cable back through the cable guide when there is no buoyancy force pulling on the cable. However, the retraction force is also weak enough such that when the cable is pulled from the cable guide by a floating antenna platform, the cable dispenses from the cable guide. In some arrangements, such cable control is managed by movable carriers equipped with pulleys which move toward from the cable guide to dispense the cable through the cable guide and which move away from the cable guide to retract the cable through the cable guide. In some arrangements, the cable feeds through the pulleys of the movable carriers in a serpentine manner and under tension. Accordingly, such techniques avoid the need to wind the cable around a spool as well as avoid the need for a slip ring. Additionally, the designs for such techniques may be low-profile and easily added to existing submersible vehicles. Furthermore, the designs naturally and automatically dispense and retract the antenna cable in response to the presence or absence of a sufficient buoyant force pulling on the cable (e.g., such operation may occur passively without power, motors, actuators, etc.). As a result, the cable remains well organized and controlled (e.g., free of twists, excessive stresses, etc. that could otherwise damage the cable or cause the cable to fail).

One embodiment is directed to a method of managing a cable for an antenna. The method includes applying (or providing) a cable retracting force to a carrier which is movable relative to a cable guide. The cable extends from a connector through the carrier and through the cable guide to an antenna platform for the antenna. The cable retracting force biases the carrier away from the cable guide. The method further includes moving the carrier toward the cable guide to dispense the cable through the cable guide in response to a pulling force on the antenna platform exceeding the cable retracting force. The method further includes moving the carrier away from the cable guide to retract the cable through the cable guide in response to the pulling force on the antenna platform being less than the cable retracting force.

Another embodiment is directed to a submersible vehicle including:

(A) a submersible vehicle body;

(B) an antenna platform constructed and arranged to, while the submersible vehicle body is submerged in water, float an antenna on a surface of the water;

(C) a cable constructed and arranged to connect with a connector on the submersible vehicle body and the antenna platform; and (D) a cable manager which includes a base coupled with the submersible vehicle body, a cable guide coupled with the base, a set of carriers coupled with the base, and a set of springs coupled with the base. The set of springs is constructed and arranged to provide a set of retracting forces on the set of carriers. The set of retracting forces provided by the set of springs is strong enough to move the set of carriers away from the cable guide and retract the cable while the submersible vehicle is on land, and further weak enough to allow the set of carriers to move toward the cable guide and dispense the cable while the submersible vehicle is submerged in water and a buoyant force from the antenna platform exceeds the set of retracting forces.

Yet another embodiment is directed to a cable manager which includes a base, a cable guide coupled with the base, a set of carriers coupled with the base, and a set of springs coupled with the base. The set of springs is constructed and arranged to provide a set of retracting forces on the set of carriers. The set of retracting forces biases the set of carriers away from the cable guide when a cable extends from a connector through the set of carriers and through the cable guide to an antenna platform for the antenna. The set of carriers is constructed and arranged to move toward the cable guide to dispense the cable through the cable guide in response to a pulling force on the antenna platform exceeding the set of retracting forces, and move away from the cable guide to retract the cable through the cable guide in response to the pulling force on the antenna platform being less than the set of retracting forces.

In some arrangements, the antenna platform includes a flotation member constructed and arranged to provide buoyancy, and a cable interface coupled with the flotation member. The cable interface is constructed and arranged to connect with an end of the cable.

In some arrangements, the cable includes multiple sets of conductors to carry multiple communications signals.

In some arrangements, the cable interface is constructed and arranged to connect multiple antennas to the multiple sets of conductors.

In some arrangements, the cable includes a set of power signal conductors. Additionally, the cable interface includes data communications equipment coupled with the set of power signal conductors. The data communications equipment is constructed and arranged to operate as a data communications device which can communicate through one or more antenna.

In some arrangements, wherein the flotation member includes camouflaging to disguise a set of antennas.

In some arrangements, the set of retracting forces provided by the set of springs is strong enough to retract the cable on land, and is further weak enough to dispense the cable in water where a buoyant force from the antenna platform exceeds the set of retracting forces.

In some arrangements, the base includes a set of carrier guides constructed and arranged restrict movement of the set of carriers along a set of radial paths relative to the cable guide.

In some arrangements, the set of carrier guides includes a first carrier guide that restricts movement of a first carrier of the set of carriers along a first radial path relative to the cable guide, and a second carrier guide that restricts movement of a second carrier of the set of carriers along a second radial path relative to the cable guide.

In some arrangements, the first radial path and the second radial path are aligned along a common axis defined by the set of carrier guides and face opposite directions.

In some arrangements, the set of springs includes a first spring constructed and arranged to bias the first carrier guide toward a first end of the base, and a second spring constructed and arranged to bias the second carrier guide toward a second end of the base that is opposite the first end.

In some arrangements, the first carrier includes a first pulley assembly to carry the cable. Additionally, the second carrier includes a second pulley assembly to further carry the cable. Furthermore, the set of springs is constructed and arranged to bias the first carrier and the second carrier away from each other while the first and second pulley assemblies carry the cable to maintain tension on the cable.

In some arrangements, the first pulley assembly includes multiple first pulleys to carry respective portions of the cable. Additionally, the second pulley assembly includes multiple second pulleys to carry other respective portions of the cable.

In some arrangements, the multiple first pulleys and the multiple second pulleys are aligned with each other to manage the cable along a serpentine cable path.

In some arrangements, the cable guide (e.g., a redirecting plate and a redirecting pulley) defines a cable opening through which the cable is dispensed and retracted.

Other embodiments are directed to systems, sub-systems and apparatus, processing circuits, assemblies, and so on. Some embodiments are directed to various methods, mechanisms and/or componentry which are involved in dispensing and retracting an antenna cable via a cable manager for a submersible vehicle.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to dispensing and retracting a cable for an antenna from a cable guide (e.g., a plate and a pulley to redirect the cable) through which a cable is biased in a retracting direction via a retraction force. The retraction force is strong enough to retract the cable back through the cable guide when there is no buoyancy force pulling on the cable. However, the retraction force is also weak enough such that when the cable is pulled from the cable guide by a floating antenna platform, the cable dispenses from the cable guide.

In some arrangements, such cable control is managed by movable carriers equipped with pulleys which move toward from the cable guide to dispense the cable through the cable guide and move away from the cable guide to retract the cable through the cable guide. In some arrangements, the cable feeds through the pulleys of the movable carriers in a serpentine manner and under tension.

Accordingly, such techniques avoid the need to wind the cable around a spool as well as avoids the need for a slip ring. Additionally, the designs for such techniques may be low-profile and easily added to existing submersible vehicles. Furthermore, the designs naturally and automatically dispense and retract the antenna cable in response to the presence or absence of a sufficient buoyant force pulling on the cable (e.g., such operation may occur passively without power, motors, actuators, etc.). As a result, the cable remains well organized and controlled (e.g., free of twists, excessive stresses, etc. that could otherwise damage the cable or cause the cable to fail).

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
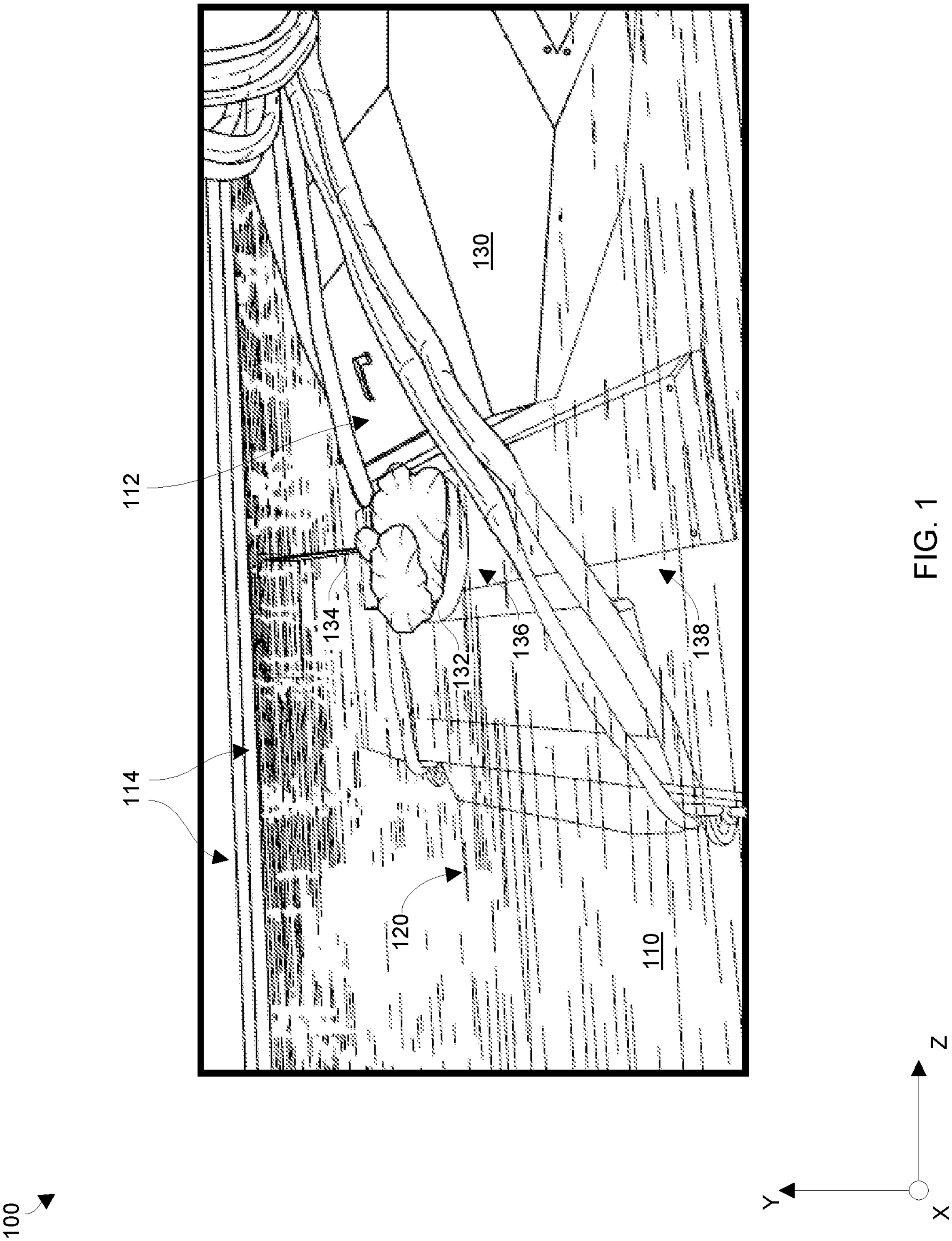
FIG. 1 is a diagram of an example environment in which embodiments of the improved technique can be practiced.

FIG. 1 is a diagram of an example environment 100 in which embodiments of the improved technique can be practiced. The example environment 100 includes a body of water 110, a submersible vehicle (or craft) 112, and other environmental structures 114 (e.g., shoreline, vegetation, debris, etc.).

The body of water 110 may be relatively deep thus enabling the submersible vehicle 112 to fully submerge below a surface 120 of the water. Along these lines, the body of water 110 may be the ocean, a sea, an inlet, a lake, a river, a pond, a marsh, other wet environments, combinations thereof, and so on. By way of example, the submersible vehicle 112 is shown in FIG. 1 as being largely below the water surface 120 but still partially above the water surface 120.

The submersible vehicle 112 is constructed and arranged to perform useful work under water and/or on land. In some arrangements, the submersible vehicle 112 routinely operates below the surface 120 of the water 110. To this end and as shown in FIG. 1, the submersible vehicle 112 includes a submersible vehicle body 130, an antenna platform 132 for a set of antennas 134 (i.e., one or more antennas 134), a cable 136 (hidden from view but shown generally by the arrow 136 in FIG. 1), and a cable manager 138.

The submersible vehicle body 130 is constructed and arranged to support and/or house various componentry. In some arrangements, the submersible vehicle body 130 is equipped to support one or more human passengers. Along these lines, the submersible vehicle 120 may have the form factor of an amphibious transport vehicle, a tank or similar military vehicle, specialized equipment for working underwater, a robotic vehicle, and so on.

The antenna platform 132 for the antenna 134 is constructed and arranged to float on the surface 120 of the water 110. Along these lines, the antenna platform 132 includes a flotation structure/device that floats on water (e.g., a section of polyurethane or polyvinyl chloride (PVC) foam, a syntactic foam, a balloon, a plastic or rubber gas-filled housing, a float made of one or more other high buoyancy materials, combinations thereof, etc.). In some arrangements, the antenna platform further includes camouflaging to make the antenna 134 unnoticeable or less noticeable (e.g., material that disguises the antenna as vegetation, debris, one or more other natural or uninteresting structures, combinations thereof, etc.). In some arrangements, the antenna platform 132 is planar in shape underneath and has an upper section suitable to support the set of antennas 134 in proper orientation for above-water, wireless signal exchange. Other shapes, topologies, form factors, and/or appearances are suitable for use as well.

The cable 136 is constructed and arranged to carry communications between a connector (e.g., a cable gland) of the submersible vehicle 112 and the set of antennas 134. In some arrangements, the cable 136 includes multiple conductors for carrying multiple and/or different types of communications signals. In some arrangements, the antenna platform 132 includes electronic equipment (e.g., data communications circuitry) and the cable 136 includes power signal conductors to deliver power from the submersible vehicle 112 to that electronic equipment. Suitable types of cable include coaxial cabling, shielded conductors, twisted pair conductors, combinations thereof, and so on.

The cable manager 138 is constructed and arranged to couple with (e.g., attach to) the submersible vehicle body 130 of the submersible vehicle 112 and dispense and/or retract the cable 136 in a neat and orderly manner. Along these lines, the cable manager 138 imposes a retraction force on the cable 136 to fully retract the cable 136 while the antenna platform 132 is out of the water 110 (e.g., while the submersible vehicle 112 is on land), but that is weak enough to dispense the cable 136 while the antenna platform 132 is floating on the water 110 due to a buoyancy force from the antenna platform 132 being greater than the retraction force. It should be understood that the cable manager 138 may be referred to as a cable retracting and dispensing (CRAD) assembly.

During operation, the submersible vehicle 112 operates on land and/or under water to perform useful work. Along these lines, while the antenna platform 132 sits atop the submersible vehicle body 130 as shown in FIG. 1 (e.g., the submersible vehicle 112 is on land or only partially submerged in the water 110), equipment of the submersible vehicle 112 may transmit and/or receive communications signals through the set of antennas 134 with one or more other communications endpoints.

At some point, the submersible vehicle 112 may move deeper into the body of water 110 until the submersible vehicle body 130 is fully below the water surface 120. During this time, the antenna platform 132 begins to float on the water surface 120 (e.g., once the antenna platform 132 contacts the water 110). However, the submersible vehicle body 130 of the submersible vehicle 112 does not float and submerges completely under the water surface 120. As the antenna platform 132 begins to float, a buoyancy force from the floating antenna platform 132 pulls on the cable 136 and the cable 136 dispenses from the cable manager 138 which is coupled with the submersible vehicle body 130 of the submersible vehicle 112. Accordingly, only the antenna platform 132 and the set of antennas 134 remain above water and the rest of the submersible vehicle 112 beneath the water surface 120. Nevertheless, the cable 136 which deploys out of the cable manager 138 maintains connectivity with the antenna platform 132 and the set of antennas 134.

While the submersible vehicle 112 is submerged, the set of antennas 134 remain above the water surface 120. Accordingly, communications equipment of the submersible vehicle 112 is able to richly and robustly communicate with one or more other communications endpoints.

It should be understood that the submersible vehicle 112 may continue to maneuver beneath the water surface 120. During such maneuvering, the set of antennas 134 remain above the water surface 120 due to the buoyancy force from the antenna platform exceeding the retraction force used by the cable manager 138 to retract the cable 136.

Then, at some point, the submersible vehicle 112 may move out of the body of water 110 such that the antenna platform 132 is no longer in contact with the water 110. As the submersible vehicle 112 moves closer to the water surface 120, the retraction force from the cable manager 138 pulls the cable 136 back into the cable manager 138. As will be explained in further detail shortly, such retraction is neat and orderly and does not require winding the cable 136 around a spool or require operation of a slip ring. Rather, cable 136 is smoothly guided back into the cable manager 138 while under slight tension to prevent inadvertent twisting, kinking, etc. that could otherwise damage or break the cable 136.

With the antenna platform 132 longer in the water 110, the cable 136 is fully retracted and the antenna platform 132 simply sits atop the submersible vehicle body 130 as before. Further details will now be provided with reference to FIGS. 2 through 5.

Figure 2:
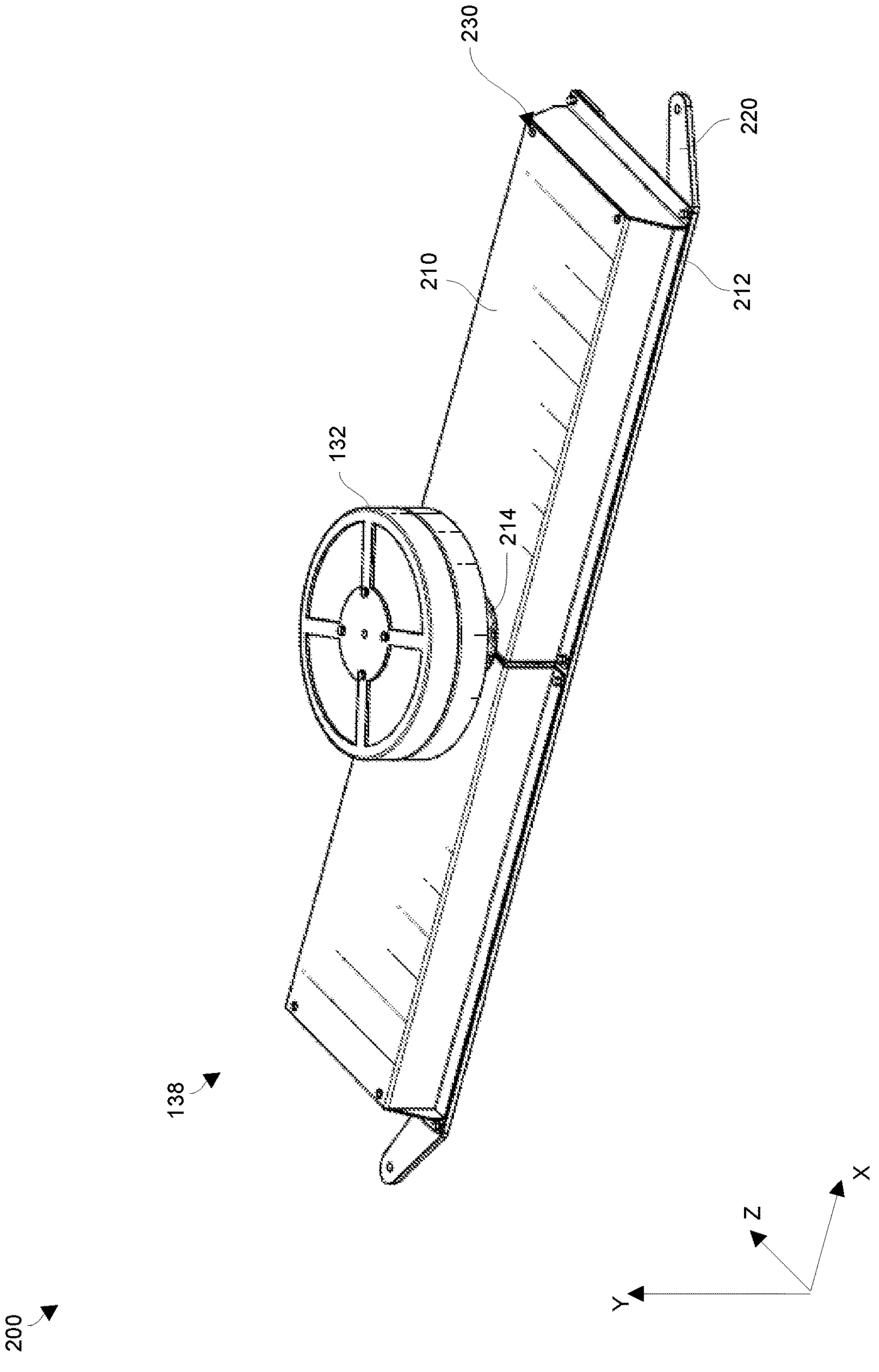
FIG. 2 shows a first view of a cable manager in accordance with certain embodiments.
Figure 3:
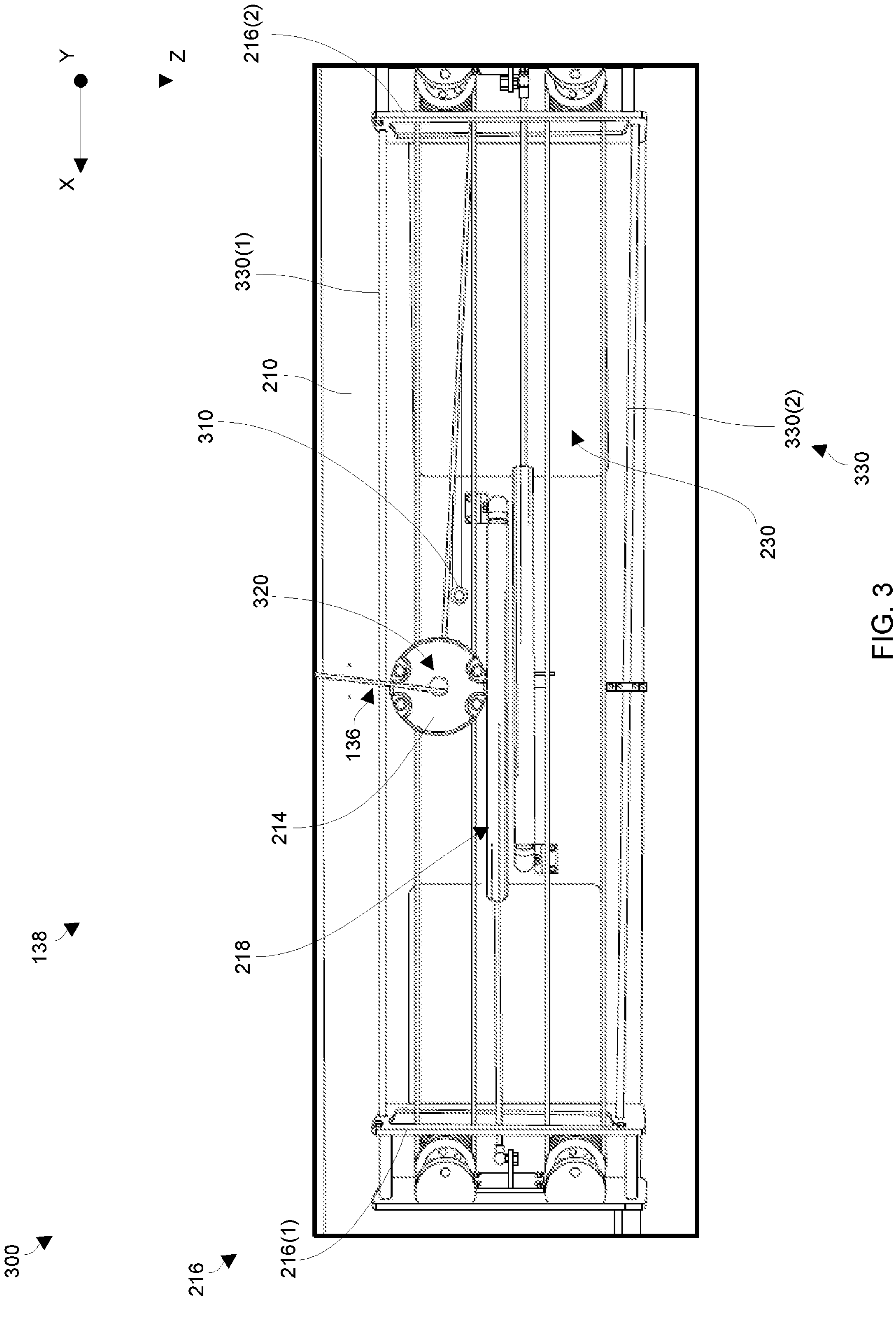
FIG. 3 shows another view of the cable manager in accordance with certain embodiments.
Figure 4:
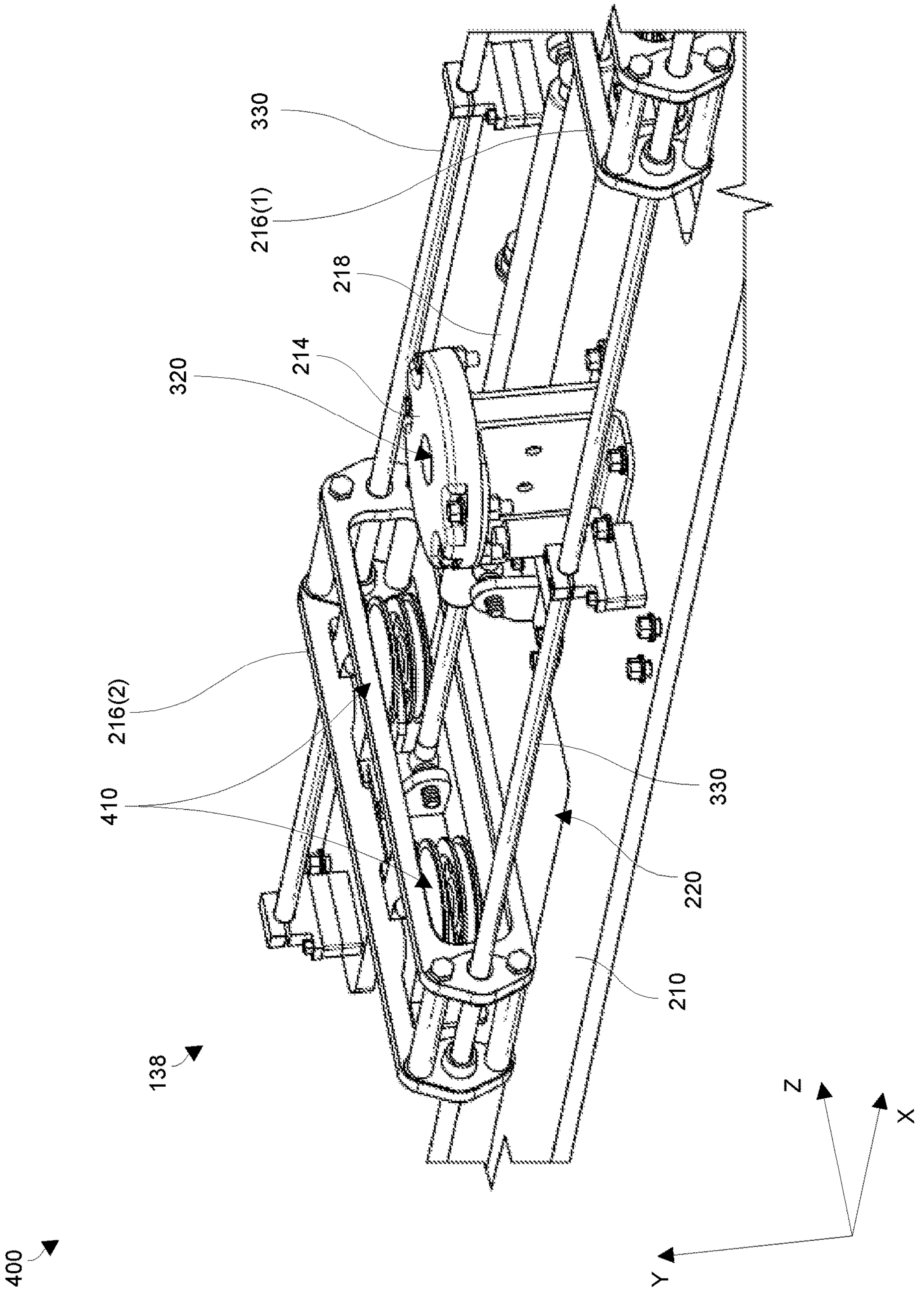
FIG. 4 shows a view of a portion of the cable manager in accordance with certain embodiments.
Figure 5:
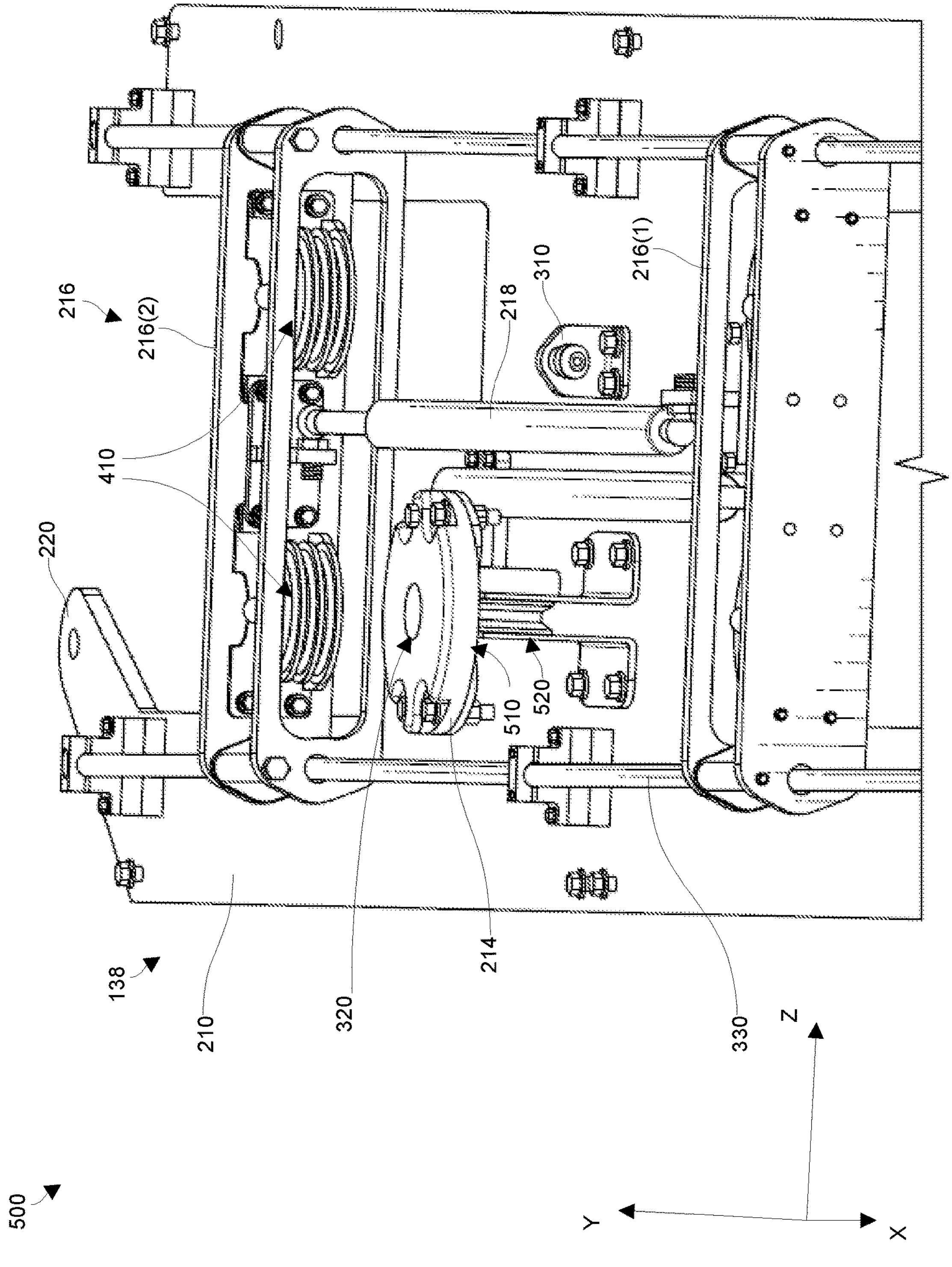
FIG. 5 shows another view of a portion of the cable manager in accordance with certain embodiments.

FIGS. 2 through 5 show certain details of the cable manager 138 in accordance with certain embodiments. FIG. 2 shows a perspective view 200 of the cable manager 138 with a cover installed in accordance with certain embodiments. FIG. 3 shows a top view 300 of the cable manager 138 without the cover in accordance with certain embodiments. FIG. 4 shows a close-up perspective view 400 of a portion of the cable manager 138 at a first angle in accordance with certain embodiments. FIG. 5 shows a close-up perspective view 500 of a portion of the cable manager 138 at a second angle in accordance with certain embodiments.

As shown in FIGS. 2 through 5, the cable manager 138 includes a base 210, a cover 212, a cable guide 214, a set of carriers 216, and a set of springs 218. During operation, the cable manager 138 is able to dispense and/or retract the cable 138 in a neat and orderly manner. It should be understood that the cable 136, although shown in FIG. 3, may be omitted in FIGS. 3 through 5 to enable other details to be seen.

The base 210 is constructed and arranged to support various other components of the cable manager 138 (e.g., see FIGS. 2 and 3). Along these lines, FIG. 2 shows the base 210 supporting the cover 212, and FIG. 3 shows the cover 212 removed from the base 210. Additionally, FIGS. 2 through 5 show the base 210 supporting the cable guide 214 through which the cable 136 passes to connect with the antenna platform 132 (also see FIG. 2).

In some arrangements, the cable manager 138 defines certain features to complement structures which are external to the cable manager 138. For example, in some arrangements, the base 210 includes one or more mounting members 220 (e.g., feet, arms, tabs, flanges, brackets, combinations thereof, etc.) to mount the cable manager 138 to another structure such as the body 130 of a submersible vehicle 112 (also see FIG. 1). Such mounting may be via hardware, detents, clamps, combinations thereof, etc.

In some arrangements, the base 210 defines certain open sections 230 that enable access to one or more interior spaces within the cable manager 138. Along these lines, one or more open sections 230 allows water, dirt, etc. to escape when the cable manager 138 is removed from water. Additionally, an open section 230 enables an end of a cable 136 to connect to a cable connector 310 (e.g., a cable gland on the body 130) of a submersible vehicle 112 (e.g., see FIG. 3).

The cover 212 is constructed and arranged to house internal componentry of the cable manager 138. Accordingly, the cover 212 provides protection against damage and/or interference (e.g., dirt, stray materials, strong water currents, animals, etc.) regardless of whether the cable manager 138 is operating on land or in water, and so on.

The cable guide 214 fastens to the based 210 and is constructed and arranged to serve as an entrance/exit point for the cable 136. Along these lines, the cable guide 214 defines an opening (or aperture) 320 through which the cable 136 passes. Accordingly, the portion of the cable 136 that has exited through the opening 320 toward the antenna platform 132 is able to properly redirect or turn toward the antenna platform 132.

The set of carriers 216 is constructed and arranged to hold or carry the cable 136 within the cable manager 138. As best seen in FIG. 3 and in accordance with certain embodiments, the cable manager 138 holds the cable 136 in a serpentine configuration in which the cable 136 extends from the cable connector 310 through the set of carriers 216 and the cable guide 214 to the antenna platform 132. With the cable 136 held (or carried) in this manner within the cable manager 138 by the set of carriers 216, there is no need for a spool on which to wind the cable 138 and potentially damage the cable 138 during winding.

By way of example only, the set of carriers 216 includes two carriers 216(1), 216(2). However, it should be understood that set of carriers 216 includes a different number of carriers in other embodiments (e.g., one carrier 216, three carriers 216, four carriers 216, etc.).

Additionally, the base 210 of the cable manager 138 is provisioned with a set of carrier guides 330 that restrict carrier movement to respective radial paths that extend from the cable guide 214. For example, first and second carrier guides 330(1), 330(2) may restrict movement of both carriers 216(1), 216(2) along a common axis (e.g., see the X-axis). However, in other embodiments, the first and second carrier guides 330(1), 330(2) independently and respectively guide the carriers 216(1), 216(2).

As best seen in FIGS. 4 and 5, the carriers 216 include sets of pulleys 410 around which the cable 136 extends. By way of example, each carrier 216 includes four pulleys 410 (or two side-by-side pairs or stacks of pulleys 410). As will be discussed in further detail shortly, the pulleys 410 enable the cable 136 to extend back and forth among the carriers 216 in an orderly and well managed manner.

The set of springs 218 fastens to the based 210 and is constructed and arranged to provide (or apply) a set of retracting forces on the set of carriers 216. The set of retracting forces biases the set of carriers 216 outwardly, away from the cable guide 214. Along these lines, one spring 218 biases the carrier 216(1) in the positive X-direction, and another spring 218 biases the carrier 216(2) in the negative X-direction. Accordingly, the cable 136 is kept under tension to prevent the cable 136 from becoming loose and tangled within the cable manager 138. Furthermore, the aggregate retracting force from the set of retracting forces pulls the cable 136 back into the cable manager 138 through the opening 320 defined by the cable guide 214 when the aggregate retracting force is greater than the buoyancy force pulling on the cable 136 in the opposite direction.

It should be understood that, as the cable 136 moves through the opening 320 defined by the cable guide 214, the cable 136 is able to pass smoothly without kinking, binding, or overstressing. In some arrangements and as shown in FIG. 5, the cable guide 214 includes a rigid redirection plate 510 and a redirecting pulley 520 which guides the cable 136 from the set of carriers 216 through the hole 320 to the antenna platform 132. In other arrangements, the cable guide 214 simply defines a rounded lip or gradual radius to enable the cable 136 to smoothly translate from one direction to another.

It should be further understood that a variety of different types of springs are suitable for use as the set of springs 218. Example types include metallic compression springs, metallic extension springs, gas springs, torsion springs, leaf springs, combinations thereof, etc.

Additionally, it should be understood that the cable manager 138 may include a variety of hardware, supports, beams, brackets, fasteners, rod keepers, spring shafts, and other members, etc. to properly position and/or operate the various components described herein. Further details will now be provided with reference to FIGS. 6 and 7.

Figure 6:
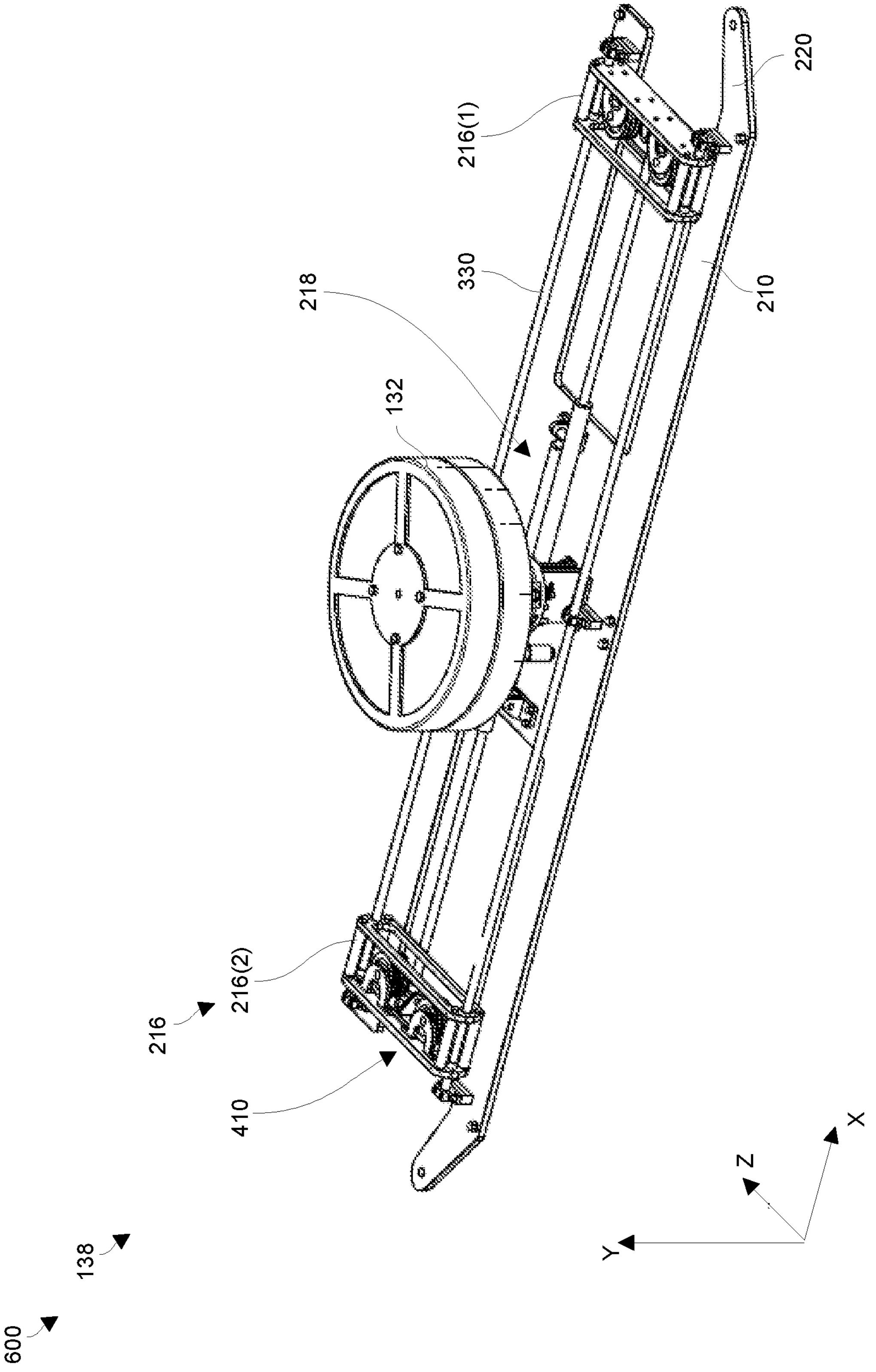
FIG. 6 shows a cable manager in an extended (or spread) configuration in accordance with certain embodiments.
Figure 7:
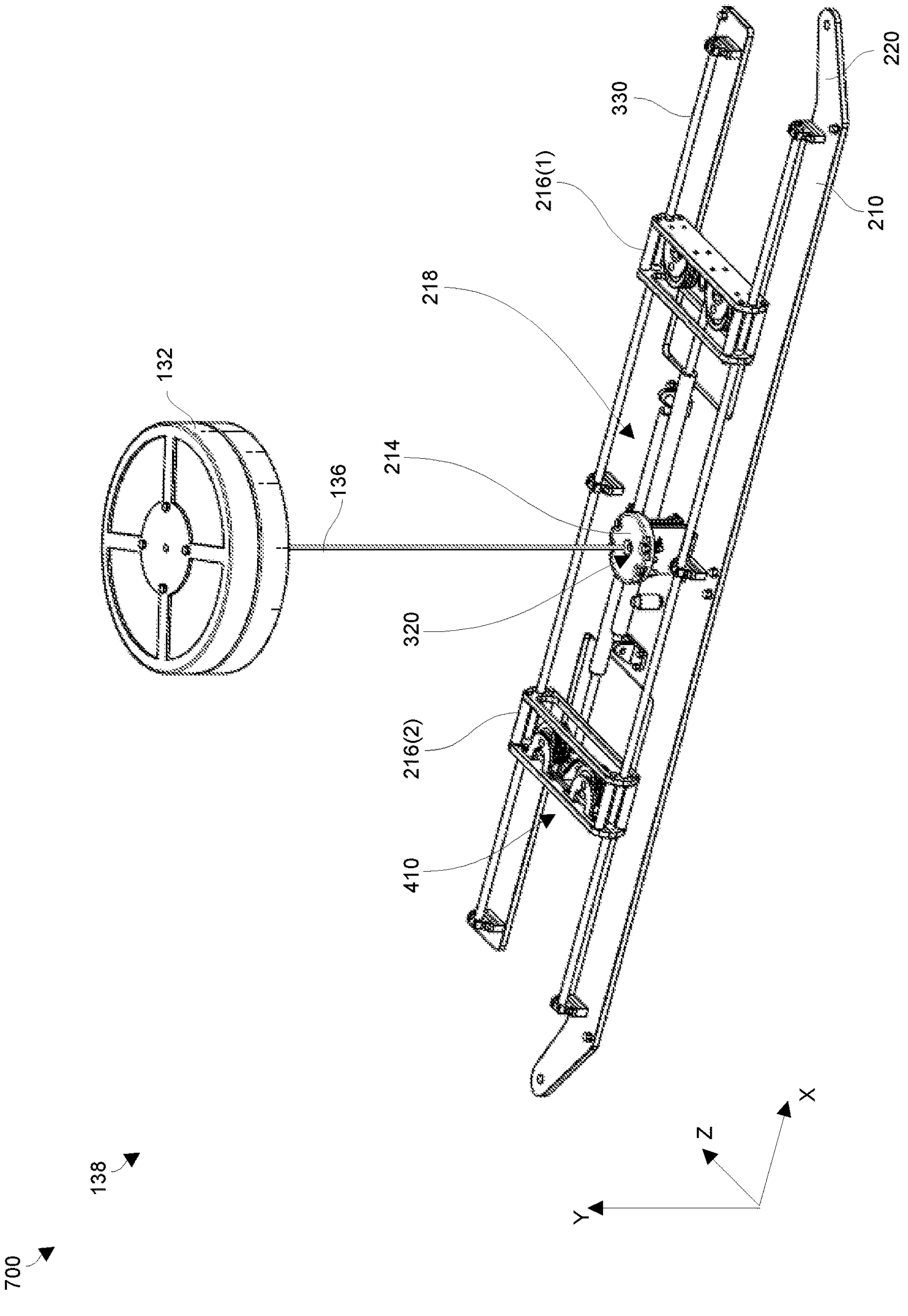
FIG. 7 shows the cable manager in compacted configuration in accordance with certain embodiments.

FIGS. 6 and 7 shows certain details of the cable manager 138 at different times of operation. FIG. 6 shows the cable manager 138 when the set of carriers 216 are in an extended (or spread) configuration. FIG. 7 shows the cable manager 138 when the set of carriers 216 are in close (or compacted) configuration. The cover 212 of the cable manager 138 as well as the horizontal portions of the cable 136 within the cable manager 138 are omitted in FIGS. 6 and 7 to show other details.

FIGS. 6 and 7 show certain operational details. FIG. 6 is a view 600 of the cable manager 138 in a fully retracted state. FIG. 7 is a view 700 of the cable manager 138 in a partial cable deployment state. The cover 212 and portions of the cable 136 within the cable manager 138 are omitted in FIGS. 6 and 7 so that other details may be viewed.

FIG. 6 shows the positioning of the set of carriers 216 adjacent the ends of the base 210 of the cable manager 138 when the cable 136 is fully retracted by the cable manager 138. In this situation, the cable 136 extends back and forth through the carriers 216 while under guidance from the pulleys 410. Due to biasing from the set of springs 218, the cable 136 remains under tension and thus does not risk getting tangled due to slack and/or subtle drifting out of position.

In this situation, the cable manager 138 is above the surface of water 110 (e.g., on land). Accordingly, there is no buoyancy force pulling on the cable 136. Instead, the retracting force provided by the set of springs 218 is strong enough to fully retract the cable 136 into cable manager 138.

FIG. 7 shows the positioning of the set of carriers 216 closer to the cable guide 214 at the center of the base 210 when the cable 136 is at least partially dispensed by the cable manager 138. In this situation, some of the cable 136 passes through the opening 320 defined by the cable guide 214 to enable the antenna platform 132 to rise and remain at the water surface 110 (also see FIG. 1) and less of the cable 136 extends back and forth through the carriers 216 while under guidance from the pulleys 410. Still, due to biasing from the set of springs 218, the cable 136 remains under tension and thus does not risk getting tangled due to slack and/or subtle drifting out of position.

In this situation, the cable manager 138 is below the surface of water 110. Accordingly, there is buoyancy force pulling on the cable 136 which is stronger than the retracting force provided by the set of springs 218. Accordingly, the carriers 216 move toward each other as the set of springs 218 compress and the cable 136 is pulled from the cable manager 138. As a result, the antenna platform 132 is able to rest on the surface of the water 110 (FIG. 1).

It should be understood that when the cable manager 138 is moved closer to the surface of the water 110, the cable manager 138 is able to retract some of the cable 136. In this situation, the retracting force from the set of springs 218 is strong enough to move the carriers 216 away from the cable guide 214 again to take up some of the cable 136 (e.g., see FIG. 6).

This dispensing and retracting process may continue while the cable manager 138 remains under water (e.g., in operation on a submersible vehicle 110). During such operation, the cable 136 is neatly guided out of and back into the cable manager 138 without the need for any winding or twisting that could otherwise cause damage or failure. Further details will now be provided with reference to FIG. 8.

Figure 8:
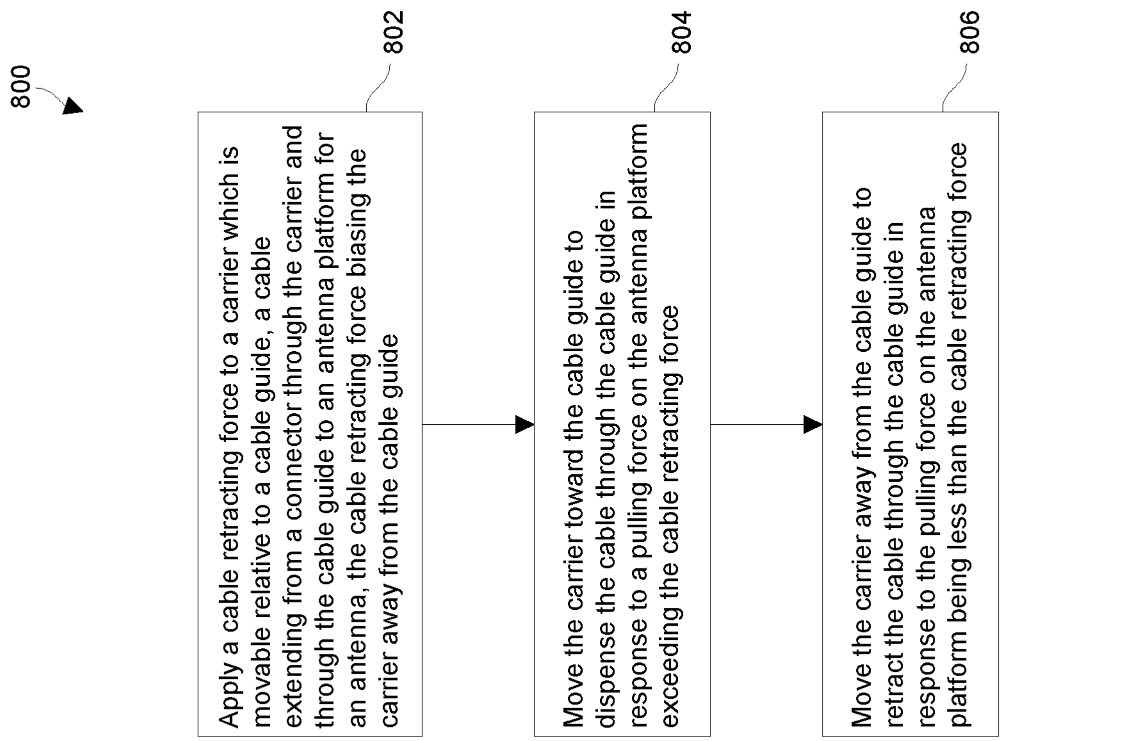
FIG. 8 is a flowchart of a procedure in accordance with certain embodiments.

FIG. 8 is a flowchart of a procedure 800 which may be performed by a cable manager to manage a cable for an antenna in accordance with certain embodiments. Such a procedure 800 may be performed to dispense and retract the cable in a wet environment such as while in use on a submersible vehicle (also see FIG. 1).

At 802, the cable manager applies (or provides) a cable retracting force to a carrier which is movable relative to a cable guide. The cable extends from a connector through the carrier and through the cable guide to an antenna platform for the antenna. Additionally, the cable retracting force biases the carrier away from the cable guide. In accordance with certain embodiments, multiple springs provides respective retracting forces to bias multiple carriers radially from the cable guide (e.g., see FIG. 3).

At 804, the cable manager moves the carrier toward the cable guide to dispense the cable through the cable guide in response to a pulling force on the antenna platform exceeding the cable retracting force. In accordance with certain embodiments, the pulling force (e.g., buoyancy force from the antenna platform floating on the surface of a body of water) is greater than an overall retracting force provided by the multiple springs thus enabling the cable to deploy from the cable manager (e.g., see FIG. 7).

At 806, the cable manager moves the carrier away from the cable guide to retract the cable through the cable guide in response to the pulling force on the antenna platform being less than the cable retracting force. In accordance with certain embodiments, the pulling force is less than the overall retracting force provided by the multiple springs thus enabling the cable to draw back into the cable manager (e.g., see FIG. 6).

It should be understood that certain embodiments utilize multiple carriers which are biased by multiple springs. The aggregate retracting force from the multiple springs biases the multiple carriers away from the cable guide as described above to retract the cable back into the cable manager when the aggregate retracting force is greater than a pulling force in the opposite direction.

Advantageously, the procedure 800 avoids winding the cable around a spool and thus avoids the need for a slip ring. Additionally, in some embodiments, the cable manager is low-profile and can be easily added to existing submersible vehicles. Furthermore, in some embodiments, the cable manager is entirely passive and requires no power or control. Rather, the cable manager is able to naturally and automatically dispense and retract the cable, in response to the presence or absence of a sufficient buoyant force from the antenna platform for the antenna.

As described above, improved techniques are directed to dispensing and retracting a cable 136 for an antenna 134 from a cable guide 214 from which the cable 136 is biased in a retracting direction via a retraction force. The retraction force is strong enough to retract the cable 136 back through the cable guide 214 when there is no buoyancy force pulling on the cable 136. However, the retraction force is also weak enough such that when the cable 136 is pulled from the cable guide 214 by a floating antenna platform 132, the cable 136 dispenses from the cable guide 214. In some arrangements, such cable control is managed by movable carriers 216 equipped with carrier pulleys 410 which move toward from the cable guide 214 to dispense the cable 136 through the cable guide 214 and move away from the cable guide 214 to retract the cable 136 through the cable guide 214. In some arrangements, the cable 136 feeds through the carrier pulleys 410 of the movable carriers 216 in a serpentine manner and under tension. Accordingly, the cable 136 remains well organized and controlled (e.g., free of twists, excessive stresses, etc. that could otherwise damage the cable or cause the cable to fail).

While various embodiments of the present disclosure have been particularly shown and described, it will be understood by those skilled in the art that various changes in form and details may be made therein without departing from the spirit and scope of the present disclosure.

In accordance with certain embodiments, a cable coupled to an antenna dispenses and retracts. The cable passes through one or more carriers that are movable along a linear path. The antenna attaches to or is integral with a float that makes the antenna buoyant in water, and a set of springs biases the set of carriers with a force that tends to retract the cable toward the vehicle. The retracting force from the set of springs is strong enough to retract the cable on land, but is also weak enough to dispense the cable in water, where a buoyant force from the antenna exceeds the retracting force.

Certain vehicle platforms feature the ability to drive on land, on the surface of water and submerge under water remotely via a remote control (or even with human passengers). For such a platform, or any other submersible vehicle, the antenna of the vehicle must generally remain above the surface of the water. In accordance with certain embodiments, the cable retracting and dispensing (CRAD) assembly is a passive mechanism that bolts to a vehicle and pans out antenna cable as a vehicle submerges into the water and retract the cable back in as the vehicle rises back out of the water. This mechanism is unique as it does not require the use of a slip ring connector and is totally passive in that it does not require an external source of power.

The cable retracting and dispensing (CRAD) assembly at a base level includes carriage(s) with pulley(s) mounted on them which can be spring loaded on a confined track or mounted stationarily within the device. Two or more of the carriages are mounted facing each other, and a cable is wrapped around the pulleys and is fixed to the base at one end utilizing a cable gland. The other end of the cable is redirected in a favorable direction and affixed to a float/buoy that has an appropriate amount of buoyancy such that it can stay afloat at the surface of the water with the tension of the cable pulling it down. The vehicle antenna(s) is connected to the top of the float/buoy. When such an assembly/mechanism is used, the float/buoy floats on the surface of the water and cable is panned out by the mechanism. The cable is panned out as the spring loaded carriage(s) rides on its track towards the opposing carriage, as the distance between the carriages decreases more cable is panned out to the float/buoy. For greater depth capabilities, the quantities of carriages and cable can be increased to suit the targeted depth.

Below is a Table of Reference Numerals referring to various things (e.g., items, structures, components, etc.) that may be involved with dispensing and retracting an antenna cable via a cable manager for a submersible vehicle. One or more of the descriptions within the table may either more broadly describe or more narrowly describe particular things in accordance with certain embodiments.

Table of Reference Numerals

| Ref. Num. | Description |
|---|---|
| 100 | Example environment including submersible vehicle equipped with cable retraction and deployment (CRAD) assembly |
| 112 | Submersible vehicle |
| 138 | Cable retracting and dispensing (CRAD) assembly |
| 134 | Antenna |
| 132 | Float(s) to establish buoyancy |
| 110 | Water (or other liquid) |
| 120 | Surface of water |
| 212 | Base of CRAD assembly |
| 230 | Openings for allowing passage of air or water (e.g., to promote drainage and wash away of debris) |
| 210 | Cover of CRAD assembly |
| 600 | Home position (fully retracted) |
| 216(1), 216(2) | First and second carriages, respectively |
| 410 | Pulley(s), e.g., four (4) pulleys per carriage (e.g., 2 stacked pairs) |
| 330 | First and second rods, respectively; e.g., carriages are configured to move along rods toward the center (when paying out cable) and toward ends (when retracting cable). |
| 218 | First and second springs, respectively; configured to apply spring forces that bias first and second carriages to respective ends |
| 136 | Cable, e.g., paid out and retracted via CRAD assembly |
| 214 | Cable guide |
| 320 | Hole in redirecting plate |
| 310 | Cable gland (anchor point for cable; provides strain relief) |
| 510 | Redirecting plate |
| 520 | Redirecting pulley |

Having described certain embodiments, numerous alternative embodiments or variations can be made. For example, although the disclosed embodiments show a pair of carriers 216, other embodiments may be constructed in which only a single carrier 216 is used, or in which greater than two carriers 216 are used.

Also, although the disclosed embodiments operate entirely passively, this is merely an example. Alternatively, embodiments may use power for various purposes, such as for securing the antenna 134 in the home position, covering the antenna 134 with a protective shield when not in use, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the disclosure.

In some examples, the set of carriers includes first and second carriers, and each carrier has a respective set of pulleys.

In some examples, the first and second carriers are arranged along a linear track, with springs configured to repel the carriers from each other and toward respective ends of the track. The cable is wound back and forth between the carriers, turning on the pulleys of the respective carriers. Each pulley linearly divides the distance traveled by the carrier(s) along the track. The number of pulleys may be varied, as needed, to establish greater or lesser division.

In some examples, only one of the carriers is moveable, with the other carrier being fixed. Although feasible for some implementations, the single-carrier arrangement is more limited than the dual-carrier arrangement in terms of the length of cable that can be paid out and retracted.

In some examples, the CRAD assembly has a base.

In some examples, the linear tracks are implemented using first and second rods coupled to the base. The rods are passed through holes in the carriers, which enables the carriers to move back and forth along the rods.

In some examples, the CRAD assembly has a protective cover.

In some examples, the CRAD assembly has an open design that allows water to enter and to flush sand and other debris out of the assembly.

In some examples, the CRAD assembly has a redirecting plate having a hole through which the cable enters the assembly. A pulley disposed below the hole redirects the cable toward one of the carriers.

In some examples, the CRAD assembly further includes a cable gland that secures an end of the cable opposite the antenna to the base. In some examples, the cable gland provides a termination for the cable. In such cases, the cable may end in a connector, which runs to communications circuitry of the vehicle. In other examples, the cable continues through the cable gland and runs directly to the communications circuitry.

In some examples, the springs are gas springs.

In some examples, the gas springs provide constant or near-constant resistance at different levels of compression. In a particular example, each spring provides a maximum force of between 10 and 20 pounds (44 and 89 Newtons).

In some examples, a sheath is provided around the cable to improve its tolerance to tension. In such cases, the sheath is coupled both to the antenna and to the base, such that the sheath, rather than the cable, bears the tensile forces.

In some examples, the cable includes multiple sub-cables contained within a single sheath.

In some examples, the springs continue to exert force even when the antenna is fully retracted.

In some examples, one or more magnets can secure the antenna to the base when the antenna is fully retracted.

Certain embodiments are directed to a cable retracting and dispensing (CRAD) assembly for use with a submersible vehicle. Other embodiments are directed to a method of dispensing and retracting a cable to an antenna.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

While various embodiments of the present disclosure have been particularly shown and described, it will be understood by those skilled in the art that various changes in form and details may be made therein without departing from the spirit and scope of the present disclosure as defined by the appended claims. Such modifications and enhancements are intended to belong to various embodiments of the disclosure.

What is claimed is:

1. A submersible vehicle, comprising:

a submersible vehicle body;

an antenna platform constructed and arranged to, while the submersible vehicle body is submerged in water, float an antenna on a surface of the water;

a cable constructed and arranged to connect with a connector on the submersible vehicle body and the antenna platform; and a cable manager including:

a base coupled with the submersible vehicle body, a cable guide coupled with the base, a set of carriers coupled with the base, and a set of springs coupled with the base, the set of springs being constructed and arranged to provide a set of retracting forces on the set of carriers, the set of retracting forces provided by the set of springs being strong enough to move the set of carriers away from the cable guide and retract the cable while the submersible vehicle is on land, and further weak enough to allow the set of carriers to move toward the cable guide and dispense the cable while the submersible vehicle is submerged in water and a buoyant force from the antenna platform exceeds the set of retracting forces.

2. A submersible vehicle as in claim 1 wherein the antenna platform includes:

a flotation member constructed and arranged to provide buoyancy, and a cable interface coupled with the flotation member, the cable interface being constructed and arranged to connect with an end of the cable.

3. A submersible vehicle as in claim 2 wherein the cable includes multiple sets of conductors to carry multiple communications signals.

4. A submersible vehicle as in claim 3 wherein the cable interface is constructed and arranged to connect multiple antennas to the multiple sets of conductors.

5. A submersible vehicle as in claim 2 wherein the cable includes a set of power signal conductors; and wherein the cable interface includes data communications equipment coupled with the set of power signal conductors, the data communications equipment being constructed and arranged to operate as a data communications device.

6. A submersible vehicle as in claim 2 wherein the flotation member includes camouflaging to disguise a set of antennas.

7. A cable manager, comprising:

a base;

a cable guide coupled with the base;

a set of carriers coupled with the base; and a set of springs coupled with the base, the set of springs being constructed and arranged to provide a set of retracting forces on the set of carriers, the set of retracting forces biasing the set of carriers away from the cable guide when a cable extends from a connector through the set of carriers and through the cable guide to an antenna platform for the antenna, the set of carriers being constructed and arranged to move toward the cable guide to dispense the cable through the cable guide in response to a pulling force on the antenna platform exceeding the set of retracting forces, and move away from the cable guide to retract the cable through the cable guide in response to the pulling force on the antenna platform being less than the set of retracting forces.

8. The cable manager as in claim 7 wherein the set of retracting forces provided by the set of springs is strong enough to retract the cable on land, and is further weak enough to dispense the cable in water where a buoyant force from the antenna platform exceeds the set of retracting forces.

9. The cable manager as in claim 7 wherein the base includes a set of carrier guides constructed and arranged restrict movement of the set of carriers along a set of radial paths relative to the cable guide.

10. The cable manager as in claim 9 wherein the set of carrier guides includes:

a first carrier guide that restricts movement of a first carrier of the set of carriers along a first radial path relative to the cable guide, and a second carrier guide that restricts movement of a second carrier of the set of carriers along a second radial path relative to the cable guide.

11. The cable manager as in claim 10 wherein the first radial path and the second radial path are aligned along a common axis defined by the set of carrier guides and face opposite directions.

12. The cable manager as in claim 10 wherein the set of springs includes:

a first spring constructed and arranged to bias the first carrier guide toward a first end of the base, and a second spring constructed and arranged to bias the second carrier guide toward a second end of the base that is opposite the first end.

13. The cable manager as in claim 10 wherein the first carrier includes a first pulley assembly to carry the cable;

wherein the second carrier includes a second pulley assembly to further carry the cable; and wherein the set of springs is constructed and arranged to bias the first carrier and the second carrier away from each other while the first and second pulley assemblies carry the cable to maintain tension on the cable.

14. The cable manager as in claim 13 wherein the first pulley assembly includes multiple first pulleys to carry respective portions of the cable; and wherein the second pulley assembly includes multiple second pulleys to carry other respective portions of the cable.

15. The cable manager as in claim 14 wherein the multiple first pulleys and the multiple second pulleys are aligned with each other to manage the cable along a serpentine cable path.

16. The cable manager as in claim 10 wherein the cable guide defines a cable opening through which the cable is dispensed and retracted.

17. A method of managing a cable for an antenna, the method comprising:

applying a cable retracting force to a carrier which is movable relative to a cable guide, the cable extending from a connector through the carrier and through the cable guide to an antenna platform for the antenna, the cable retracting force biasing the carrier away from the cable guide;

moving the carrier toward the cable guide to dispense the cable through the cable guide in response to a pulling force on the antenna platform exceeding the cable retracting force; and moving the carrier away from the cable guide to retract the cable through the cable guide in response to the pulling force on the antenna platform being less than the cable retracting force.

18. The cable manager as in claim 7 wherein the set of carriers includes:

a first carrier constructed and arranged to move along a linear path relative to the base; and a second carrier constructed and arranged to move along the linear path relative to the base.

19. The cable manager as in claim 18 wherein the first carrier is constructed and arranged to move in a first direction along the linear path and the second carrier is constructed and arranged to move in a second direction along the linear path, the second direction being opposite the first direction, when cable manager dispenses the cable; and wherein the first carrier is constructed and arranged to move in the second direction along the linear path and the second carrier is constructed and arranged to move in the first direction along the linear path, when cable manager retracts the cable.

20. The cable manager as in claim 18 wherein the set of springs is disposed between the first carrier and the second carrier; and wherein the cable guide is disposed between the first carrier and the second carrier.

* * * * *